Oct. 12, 1965  J. J. LEWAKOWSKI  3,211,424
CONTROL MECHANISM FOR ADJUSTABLE GAS TURBINE NOZZLE
Filed Aug. 19, 1964  6 Sheets-Sheet 1

FIG. 1.

INVENTOR.
John Janusz Lewakowski.
BY
Harness and Harris
ATTORNEYS

Oct. 12, 1965     J. J. LEWAKOWSKI     3,211,424
CONTROL MECHANISM FOR ADJUSTABLE GAS TURBINE NOZZLE
Filed Aug. 19, 1964     6 Sheets-Sheet 4

INVENTOR.
John Janusz Lewakowski.
BY
Harness and Harris
ATTORNEYS.

Oct. 12, 1965   J. J. LEWAKOWSKI   3,211,424
CONTROL MECHANISM FOR ADJUSTABLE GAS TURBINE NOZZLE
Filed Aug. 19, 1964   6 Sheets-Sheet 5

INVENTOR.
John Janusz Lewakowski
BY
Harness and Harris
ATTORNEYS.

United States Patent Office 3,211,424
Patented Oct. 12, 1965

3,211,424
CONTROL MECHANISM FOR ADJUSTABLE
GAS TURBINE NOZZLE
John J. Lewakowski, Garden City, Mich., assignor to Chrysler Corporation, Highland Park, Mich., a corporation of Delaware
Filed Aug. 19, 1964, Ser. No. 390,638
10 Claims. (Cl. 253—52)

This invention relates generally to a gas turbine engine and more particularly to a control mechanism associated with such a gas turbine engine for varying the position of the nozzle vanes of a variable nozzle assembly, contained within the flow path of the driving motive gases, so as to vary the power imparted to the engine rotors or turbine wheels in accordance with indicia of engine operating conditions and operator requirements.

In one type of two-stage automotive gas turbine engine, a first stage rotor drives an air compressor which supplies combustion supporting air under comparatively high pressure to the exothermic portion of a regenerator to be heated thereby. Thereafter the air is conducted to the first and to a second rotor stage to power the same and is then exhausted through the endothermic portion of the regenerator to heat the latter. During the course of the flow of the compressor discharge air, fuel is added and burned in a combustion chamber to supply the necessary energy for driving the two rotor stages, the second of which is employed to propel the vehicle and is therefore referred to, herein, as the power rotor or power turbine.

The provision of an adjustable nozzle assembly, placed intermediate of the two rotor stages, for varying the direction of flow of the motive gases so as to thereby change the angle at which such gases impinge upon the blades of the power rotor and consequently vary the driving power supplied thereto is generally well known in the art.

Accordingly, it is a principal object of this invention to provide a novel and improved nozzle actuating mechanism for controlling the position of the nozzle vanes comprising the adjustable nozzle assembly.

Another object of this invention is to provide a novel and improved valving arrangement in a nozzle actuating mechanism.

A further object of this invention is to provide an improved nozzle actuating mechanism which is continuously responsive to engine operating conditions for automatically varying the position of the adjustable nozzle vanes in order to be reflective of such operating conditions.

Still another object of this invention is to provide an improved nozzle vane acutating mechanism which is continuously responsive to both engine operating conditions and operator requirements so as to determine that position of the adjustable nozzle assembly which is proper for the then existing conditions and requirements.

Other objects and advantages of the invention will become apparent when reference is made to the following description and drawings wherein:

FIGURES 5, 6, 7 and 8 are cross-sectional views taken generally on the plane of line 5—5 of FIGURE 3 respectively illustrating different operating positions;

Certain elements may be omitted from one or more figures for purposes of clarity.

Figure 1:
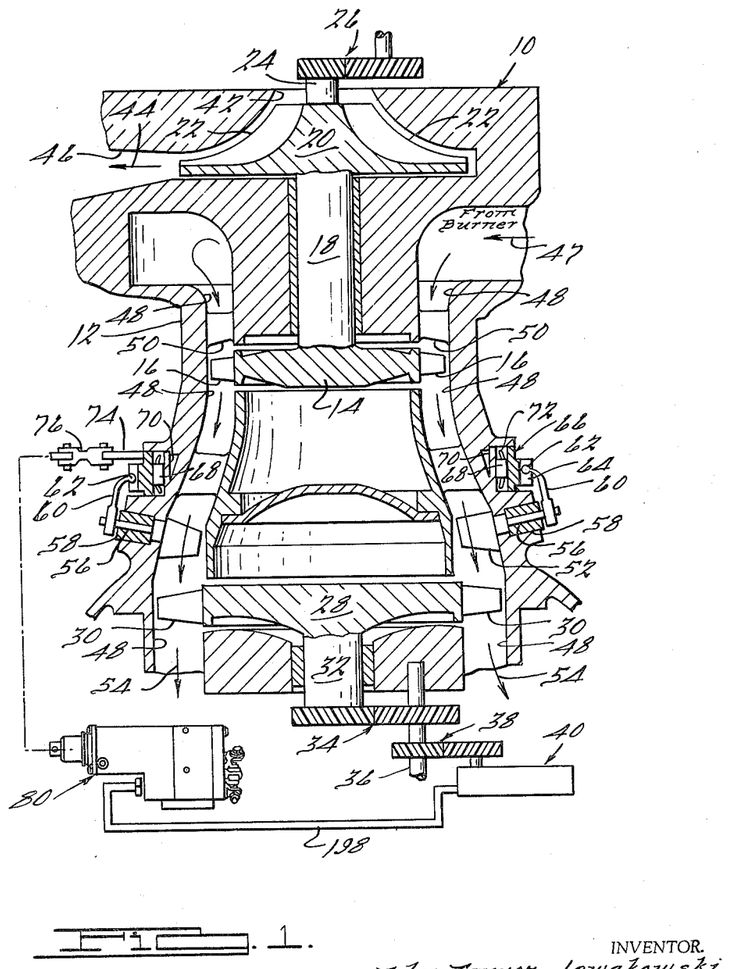
FIGURE 1 illustrates, in cross-section, a turbine engine equipped with an adjustable nozzle assembly which is positioned by a control mechanism constructed in accordance with the teachings of the invention.

Referring now in greater detail to the drawings, FIGURE 1 diagrammatically illustrates a gas turbine engine 10 comprised of an engine housing 12 containing a circular first stage or compressor driving rotor 14 having a plurality of radially extending and circumferentially spaced peripheral blades 16. The rotor 14 is mounted on a shaft 18, suitably journaled within the engine housing 12, keyed to a rotatable compressor 20, having a plurality of circumferentially spaced and radially extending blades 22. Also driven by shaft 18 is a coaxial shaft 24 which by means of a suitable gear train 26, delivers power for operating various associated accessories.

Spaced axially downstream from rotor 14 is a circular second stage or power rotor 28 also having a plurality of peripherally situated circumferentially spaced and radially extending blades 30. Rotor 28 is suitably mounted on a drive shaft 32 in order to drive said shaft which is, in turn, operatively connected with the vehicle ground engaging wheels to drive the same by means of a suitable gear train 34 and shaft 36.

Shaft 36 is also operatively connected, as by means of a gear train 38, with a power rotor speed signal generator 40 which operates in response to vehicle speed and emits a signal as a direct function of said speed as will be described.

During operation of the engine, air is drawn through housing inlet 42 into the compressor 20 and discharged at comparatively high pressure at 44 by the compressor blades 22. The high pressure air is then directed by suitable conduit means 46 to the comparatively hot portion of a regenerator type of heat exchanger to be heated thereby and subsequently directed to a burner wherein fuel is added and burned. The hot gaseous combustion products 47 are then conveyed by a suitable conduit system 48 to the peripheral blades 16 of the compressor rotor 14. Immediately upstream of rotor 14, the conduit system includes a coaxial annular portion containing a set of circumferentially spaced and radially directed fixed nozzles or vanes 50 for directing the hot gases to the compressor rotor blades 16 at a predetermined angle in order to rotate rotor 14 and compressor 20.

Immediately upstream of the power rotor blades 30, the conduit system 48 comprises a coaxial annular portion containing a circumferentially arranged set of adjustable nozzles or vanes 52 which determine the angle at which the hot gases 47 will impinge upon the rotor blades 30 so as to vary the power imparted thereto. Downstream of power rotor blades 30, the gases which have given up a major portion of their energy are exhausted at 54 to the comparatively cold portion of the regenerator in order to heat it.

Each of the adjustable nozzle vanes 52 is rotatable about the axis of an associated spindle 56 extending generally radially from the axis of rotor 28. Each spindle 56, journaled within the housing 12 by means of a suitable bearing 58, has its innermost end secured to the outermost end of the associated nozzle vane 52 in order to rotate the vane 52 about the spindle axis. The radially outer end of each spindle 56 is keyed to an arm 60 extending radially from the axis of the spindle 56 and terminating in a rounded portion confined within a slot 64 formed in an adjusting ring 66.

The ring 66 extends coaxially about the adjacent conduit system 48 and may be supported for rotatable adjustment about its center by means of a plurality of rollers 68 which are supported by an annular portion 70 on housing 12 and maintained circumferentially spaced thereabout by a roller cage 72.

At one location on the ring 66 is secured a radial bracket arm 74 which is connected by suitable linkage 76 to a movable portion of a nozzle actuating assembly 80.

Referring to FIGURE 5, nozzle actuating valve assembly 80 is comprised of a housing 82 having a cylindrical chamber 84 formed therein which slidably receives a differential area slave piston 86. The piston 86 is comprised of generally telescoping portions 85 and 87 which when assembled in the manner illustrated, form a piston 86 having fluid flow passages 88, 90, 92, 94 and 96 therein. The larger diameter 98 of piston 86 serves to divide the general chamber 84 into two variable but distinct chambers 100 and 102 which, as will be subsequently described, are at times interconnected by selected passage means. The smaller diameter 104 of piston 86 is slidably received through an aperture 106 formed within an end member 108 which is secured to the housing 82, as by screws 110, so as to generally define one axial end of the general chamber 84. Crosswise apertures 112 may be formed in member 85 in order to facilitate connection with such suitable linkage as 76 (FIGURE 1) in order to control the position of ring 66. A generally tubular seal 114, located about piston 86 and having axially spaced annular convolutions, is secured at one end to member 85 and at the other end to end member 108 in order to prevent the entry of foreign particles within the operating mechanism.

Telescoping member 87 of piston 86 has an inner diameter 116 which closely receives therein a rotatable valve assembly 120. As will become apparent, piston 86 and valve assembly 120 are adapted so as to experience relative angular and axial motion therebetween.

Valve assembly 120 is comprised of an inner tubular member 122 journaled for rotation at one end in a bushing member 124 which is also provided with fluid passages 126 and 128. A valving element 130 is carried about tubular member 122 and is secured thereto as by a pin 132 so as to retain a predetermined axial and angular relationship with respect to tubular support 122.

The tubular support 122 is restrained against relative axial movement by means of an annular flange 134 at one end of bushing 124 and a second flange 136 disposed at the other end of bushing 124. The journaled end of tubular member 122 is provided with an extension 138 of reduced diameter which is also at least partly threaded so as to accommodate a nut 140 which serves to retain the flange member 136, a gear 142 and spacer 144 on the extension 138. A locating pin 146 serves to maintain a predetermined angular relationship between gear 142 and tubular member 122.

An end cover 148 secured to housing 82 as by means of screws 150, and containing a suitable seal 152 therebetween, carries a shaft 154 which has secured thereto a driving gear 156 engaging gear 142. A pin 158 is provided in order to maintain a set angular relationship between gear 156 and shaft 154. Externally of cover 148, shaft 154 is connected to an actuating lever 160 (also see FIGURES 2 and 3) which is operatively connected to the throttle linkage 162 as illustrated generally in FIGURE 15.

Tubular member 122 is provided with an elongated axially extending passageway or conduit 164. One end of conduit 164 communicates with chamber 166 defined generally by the inner diameter 116 of piston member 87, while the other end communicates with chamber 168 which generally contains gears 142 and 156 and is defined by housing 82 and cover 148.

Tubular member 122 is also provided with a valving arrangement within its journaled end. That is, a relatively narrow axially elongated fluid passageway 170 is formed generally radially so as to at times complete communication between conduit 164 and passageway 126. Portion 172 is merely an annular relief and does not function to complete any hydraulic circuitry (also see FIGURES 10, 12, 14 and 20). A second arcuate recess 174 at times communicates with passageway 128 and orifices 176 and 178 in turn complete communication between recess 174 and conduit 164 (also see FIGURES 9, 11, 13 and 20).

Valve element 130 has formed thereon at its opposite ends, valving or metering edges 180 and 182 which, as will become apparent, cooperate with ports 92, 88 and 94 to determine the axial position of piston 86. An elongated rod 184 closely received by housing 82 and by a groove 186 of end member 108, serves as a guide or key for piston 86 by passing therethrough in a manner permitting of sliding motion therebetween.

A cylindrical chamber 188, containing a spring 190 at one end thereof, slidably receives a spool valve 192 which has axially spaced land portions 194 and 196 formed thereon which cooperate with chamber 188 in defining selected fluid passageways. A conduit 198 secured to a suitable fitting 200 communicates between chamber 188, at one end of spool valve 192, and speed signal generator 40 (FIGURE 1).

Conduit 202, by means of a suitable source such as a constant pressure pump 204 and reservoir 206, supplies fluid under a relatively high pressure, $P_1$, to chamber 188 at a point which is always between lands 194 and 196 of spool valve 192. Conduit 208 which, by virtue of chamber 188, is in constant communication with conduit 202 serves to transmit fluid under pressure $P_1$, to conduits 210 and 212 from where it is directed to chamber 100.

Conduits 214 and 217 communicate respectively between passages 126 and 128 and chamber 188. Conduit 218 is a low pressure return from chamber 188 to the reservoir 206.

OPERATION

The operation of the invention will be described under four general conditions of engine operation which will be representative of all conditions that the engine might experience. These conditions, in order of presentation are (1) Engine idle, (2) Engine acceleration, (3) Economy range and (4) Engine braking.

The various fluid pressures encountered within valve assembly 80 have importance only as to their relative magnitudes. Therefore, pressure $P_1$ will designate the highest pressure, $P_3$, a reference pressure, is the lowest while $P_2$ is a variable intermediate pressure generally within the limits of $P_1$ and $P_3$. The speed signal generator 40 produces a pressure $P_s$ which is indicative of vehicle speed and which has a value which may be greater than $P_3$ but is less than $P_1$.

Engine idle

The speed signal generator 40 is adapted to provide a variable pressure $P_s$ which, for example, at vehicle speeds below 10 m.p.h. is insufficient to overcome the combined force of spring 190 and pressure $P_3$ within chamber 188 to the right of land 196. Accordingly, if the engine is at idle condition and the vehicle is either not in motion or traveling at a speed below 10 m.p.h., the various elements comprising the valve assembly 80 will assume positions as illustrated in FIGURE 5.

At this time, the operator, as by means of the pedal 215 (FIGURE 15), has caused lever 160, gears 156 and 142 and tubular member 122 to rotate about their respective axis and assume positions illustrated in FIGURE 5. Land portion 216 of the valving end of tubular member 122 prevents flow of fluid through passageway 128. However, conduit 214, passageways 126 and 170, conduit 164, chamber 166 and chamber 168 are all in open communication with each other and with conduit 218 thereby existing at a pressure $P_3$.

Pressure $P_s$ is, at this time, insufficient to move spool valve 192 to the right.

Slave piston 86, partially withdrawn into chamber 84, is maintained in the position illustrated by equal and oppositely directed forces acting on the radial surfaces 220 and 222 of the larger diameter 98. That is, the greater pressure $P_1$, applied against the smaller area of surface 220 equals the smaller pressure, $P_2$, applied against the larger area of surface 222. At this time, port 88, which is at a pressure $P_1$, is just covered by edge 182 of valve member 130 and port 92, which is at a pressure $P_2$, is just covered by edge 180 of valve member 130. Consequently, if pressure $P_2$ for some reason increases relatively to pressure $P_1$, piston 86 becomes momentarily hydraulically unbalanced resulting in a very slight movement thereof to the left, as viewed in FIGURE 5. Such movement to the left causes port 88 to become completely closed (assuming that it previously had a very slight flow rate into chamber 102) and causes port 92 to become opened. The opening of port 92, which is at a pressure $P_2$, results in a slight flow of fluid from chamber 102, through conduit 96, annular passage 90 and port 92 into chamber 166, conduit 164, passageway 170 and into reservoir 206. This flow, even though very slight, is sufficient to reduce pressure $P_2$ to the degree causing slave piston 86 to reverse its direction and move back to the right to the position illustrated in FIGURE 5 which can be considered a null position. Preferably, although not absolutely necessary, ports 88 and 92 are of such a cross-sectional configuration and their locations with respect to edges 180 and 182 of valve member 130 are such as to permit a continual minute flow through ports 88 and 92 when they are in the null position.

Likewise, if pressure $P_2$ decreases relatively to pressure $P_1$, piston 86 moves a very slight amount to the right causing port 88 to become more fully open with respect to edge 182 and chamber 102 which results in pressure $P_2$ being increased by the feeding action of the relatively high pressure $P_1$ of chamber 100. By increasing pressure $P_2$ in this manner, the stability of piston 86 is once more established.

It should be noted that the action described above constitutes a closed-loop system. That is, any relative variations between pressures $P_1$ and $P_2$ result in the slave piston 86 moving in a direction which will not only correct the pressure variation but also cancel the movement of the piston which was required to bring about the pressure correction. For example, if the slave piston 86 moves to the right, communication between 92, 94 and chamber 166 is completely terminated. Consequently, as correction of pressure $P_2$ is taking place by flow of fluid through port 88, piston 86 is simultaneously experiencing movement back to the left which results in the closing off of port 88 and the establishment of a stable null condition.

Engine acceleration

Figures 2, 3:
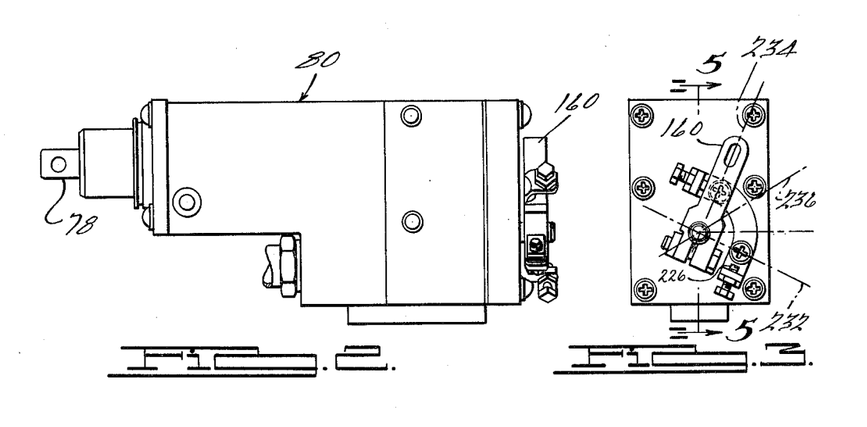
FIGURES 2 and 3 are side and end elevational views, respectively, of a nozzle actuating valve assembly constructed in accordance with this invention.

If the vehicle operator requires full engine acceleration from the condition of engine idle, lever 160 is rotated clockwise, as viewed in FIGURE 3, until its center-line assumes the position indicated at 232 as determined by the adjustable abutment 226. Such rotation of lever 160 causes rotation of gears 156, 142 and ultimately valve assembly 120. Preferably, gears 156 and 142 are in a ratio of 3:1 to each other thereby allowing 270° of rotation of valve assembly 120 for 90° of rotation of lever 160. Further, in view of FIGURES 5, 6, 7 or 8, it should be apparent that clockwise rotation of lever 160 causes counterclockwise rotation of valve assembly 120.

As valve assembly 120 is so rotated, the metering edges 180 and 182 of valve member 130, because of their contours, have the effect of moving to the right. Consequently, port 92 tends to become more nearly opened while port 88 becomes more fully closed. Accordingly, pressure $P_2$ is at least temporarily somewhat reduced thereby allowing slave piston 86 to be moved to the right until ports 92 and 88 are again in a null position with respect to edges 180 and 182 as illustrated in FIGURE 6.

Economy range

If, after the vehicle has attained a desired speed, the operator wishes to continue driving at what is sometimes referred to as roadload or economy range conditions (merely maintaining a comfortable speed) lever 160 is rotated counter-clockwise from position 232 to some intermediate position as at 236. Valve assembly 120 is consequently rotated clockwise changing its position from that of FIGURE 6 to that of FIGURE 7. During the transitional period, the hydraulic equilibrium is again disturbed causing slave piston 86 to move some amount to the right until stability of piston 86 is finally again achieved in the manner described with reference to FIGURES 5 and 6.

Engine braking

During periods of vehicle deceleration, such as that experienced in bringing the vehicle to a stop, it becomes advantageous to have the engine perform at least a part of the braking function. Accordingly, assuming such vehicle deceleration to be desired, lever 160 is rotated counterclockwise until it assumes the original "idle" position as shown in FIGURE 3. It should be noted that in comparing FIGURES 5 and 8 that valve assembly 120 is in a substantially identical position in each instance. However, slave piston 86, has, in FIGURE 8, moved a maximum distance to the left so as to have surface 220 in abutting engagement with end member 108. This is achieved because pressure $P_s$, produced by the speed signal generator 40, is able to overcome the combined opposing force of spring 190 and pressure $P_3$ in moving spool valve 192 to the right so as to complete communication between conduit 214 and conduit 202 which is at a relatively high pressure $P_1$.

Figures 8, 12:
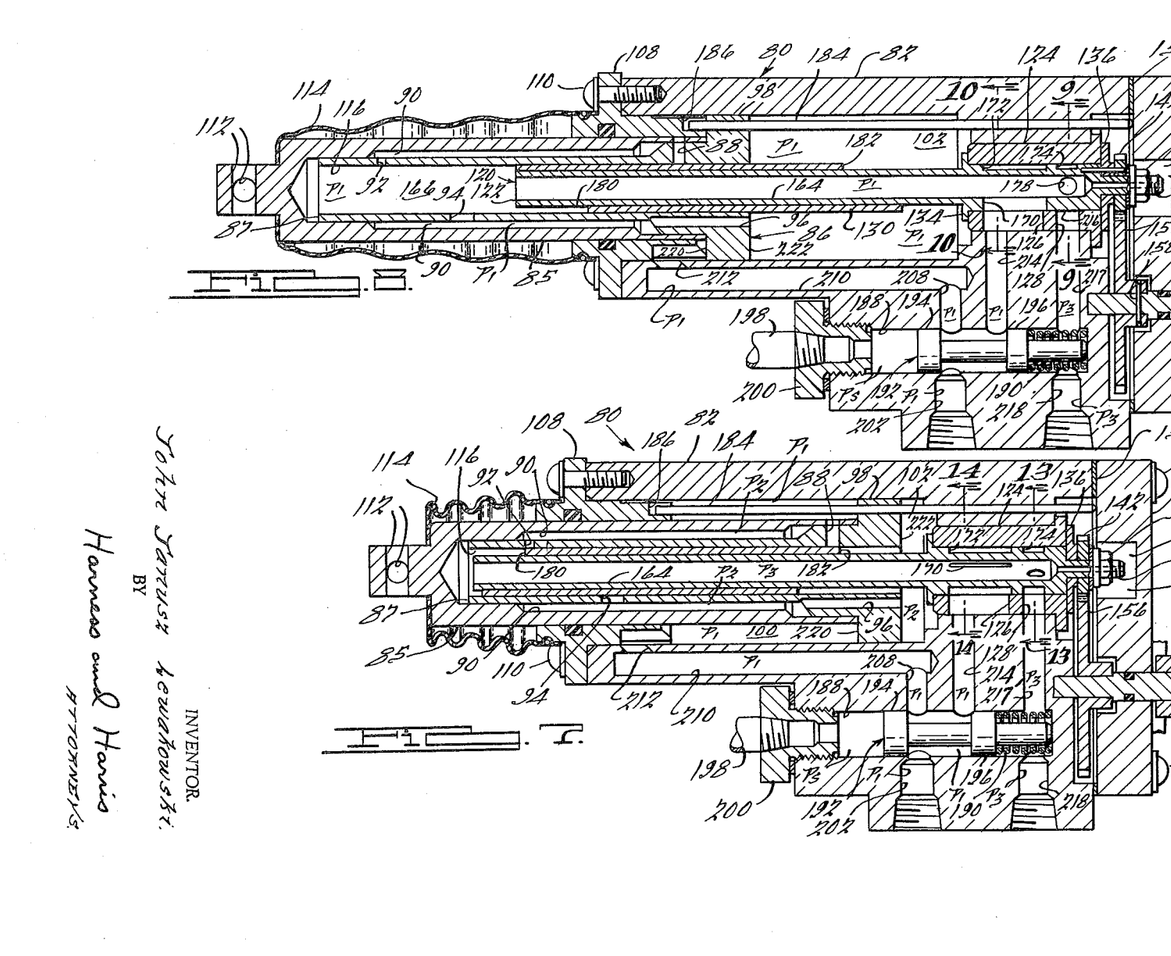
Figure 9:
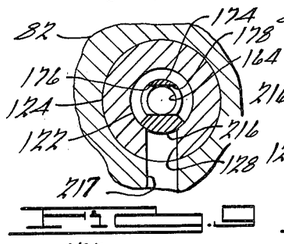
FIGURES 9 and 10 are fragmentary cross-sectional views taken generally on the planes of lines 9—9 and 10—10, respectively, of either FIGURES 5 or 8.
Figure 10:
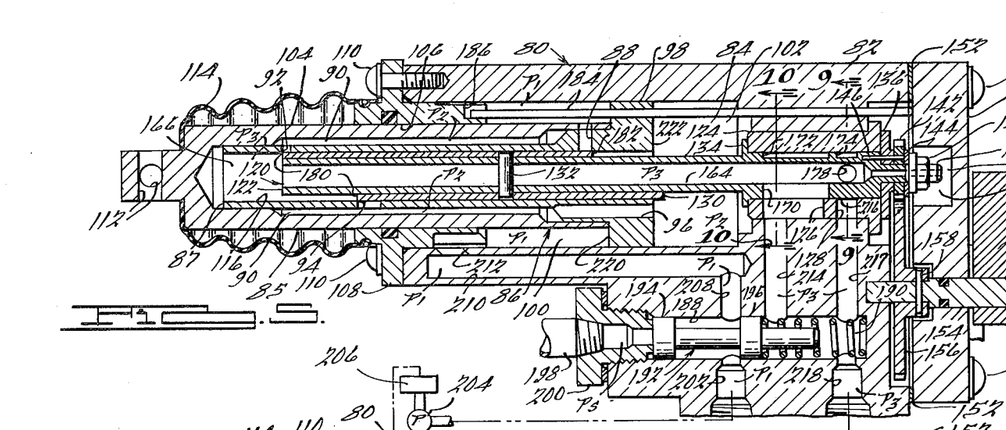

The position of the spool valve 192 is, of course, the same in FIGURES 7 and 8. However, in FIGURE 8, valve assembly 120 has been rotated to the position illustrated (see also FIGURES 9 and 10) thereby completing communication of high pressure $P_1$ through passageways 126 and 170 into conduit 164 and chamber 166. Consequently, with chambers 100, 102, chamber 166 and conduit 164 being at a pressure $P_1$ an unbalanced force is created against piston 86 moving the slave piston 86 against the end member 108. At this condition piston 86 is undergoing open loop operation in that the entire piston is exposed to the same pressure $P_1$, and therefore its position is determined by a mechanical stop rather than a balancing of opposed hydraulic forces.

As vehicle speed decreases and becomes less than 10 m.p.h., the signal pressure diminishes to a value which is insufficient to overcome the combined force of pressure $P_3$ and spring 190 thereby allowing spool valve 192 to move to the left assuming the position shown in FIGURE 5. Chamber 166, conduit 164 and passageway 170 become hydraulically connected to the low return pressure $P_3$ of conduit 218. As this occurs, the relatively low pressure $P_3$ is communicated through ports 92 and 94 to chamber 90 and subsequently through conduit 96 to chamber 102. The reduction in pressure in chamber 102 enables the relatively high pressure of chamber 100 to move piston 86 to the right until ports 92 and 88 and edges 180 and 182 attain a null position and achieve stability of piston 86.

Figure 11:
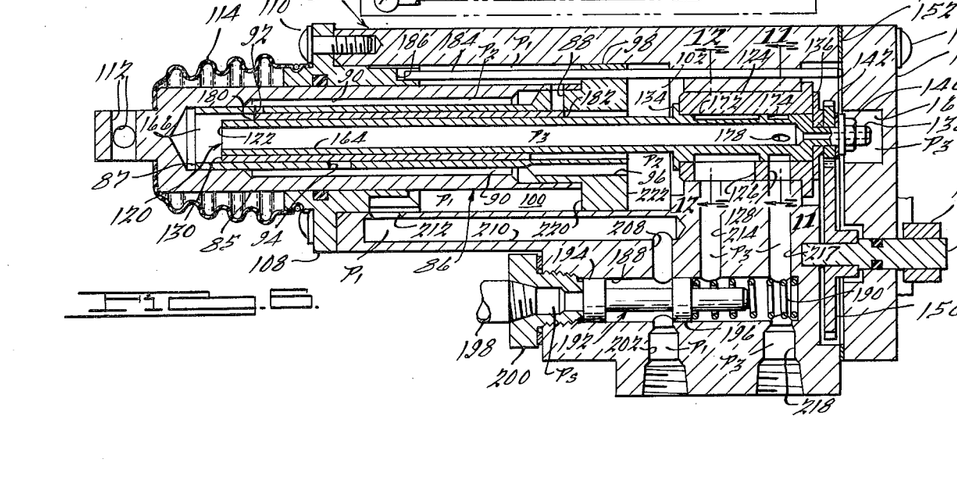
FIGURES 11 and 12 are fragmentary cross-sectional views taken generally on the planes of lines 11—11 and 12—12, respectively, of FIGURE 6.
Figures 11, 13:
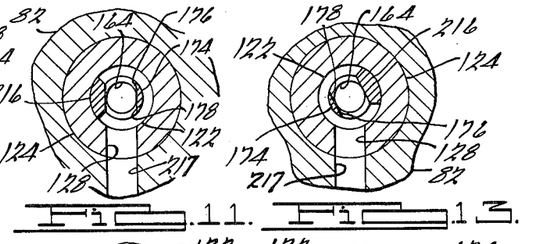
FIGURES 13 and 14 are fragmentary cross-sectional views taken on the planes of 13—13 and 14—14 of FIGURE 7.
Figures 12, 14:
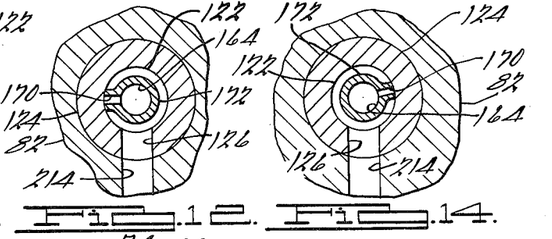
Figures 15, 16, 17, 18:
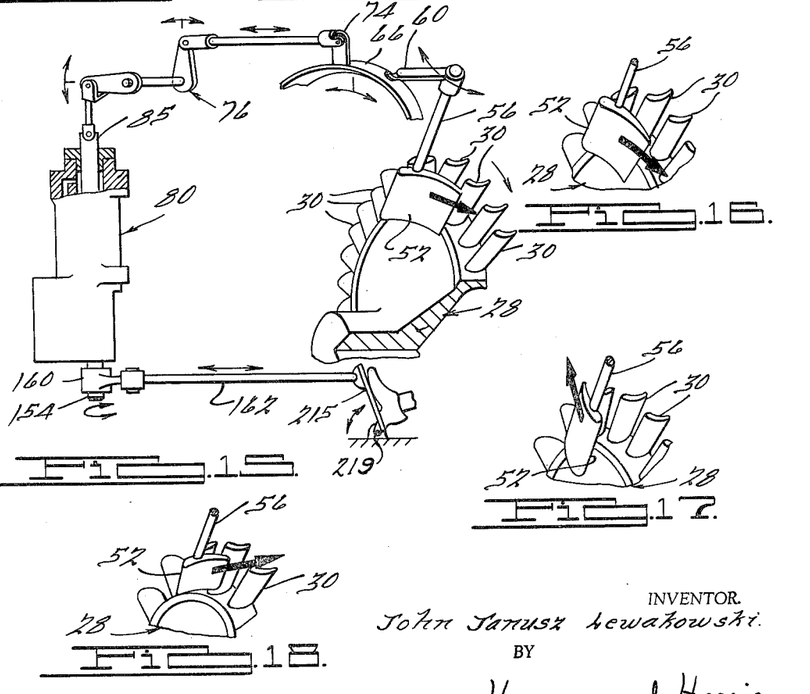
FIGURES 15, 16, 17 and 18 are diagrammatic views illustrating positions of the adjustable nozzle vanes corresponding to FIGURES 6, 7, 8 and 5, respectively.

In each of the conditions described above, the position of the piston 86, by virtue of connecting linkages 76, is translated into a corresponding position of the adjustable nozzle vanes 52. For example, FIGURES 15, 16, 17 and 18 diagrammatically illustrate the position of nozzles 52 for each condition. FIGURE 15 which corresponds generally to FIGURES 6, 11 and 12, illustrates the matched condition of the nozzle vane 52 and turbine blades 30 as will be experienced generally during either full engine acceleration or designed maximum compressor speed.

As the operator attains desired vehicle speed and allows the throttle pedal 215 to rotate generally clockwise about pivot 219 the nozzle vane 52 is rotated a slightly greater amount clockwise (as viewed from the spindle 56 end of the vane 52) to an economy position illustrated in FIGURE 16. The economy range of engine operation, a rather broad area defined generally by the contour of the metering edges 180 and 182, has been previously described with reference to FIGURES 7, 13 and 14.

During engine braking conditions the throttle control pedal 215 is rotated to its maximum clockwise position thereby causing piston 86 to attain its most extended position so as to rotate arm 60 counter-clockwise about the axis of spindle 56 and position nozzle vanes 52 in the extreme position illustrated in FIGURE 17. This condition corresponds to FIGURES 8, 9 and 10. Once vehicle speed decreases below a predetermined minimum (assumed to be 10 m.p.h.) the piston 86 is partly withdrawn into the housing 82, as discussed with reference to FIGURES 5 and 8, thereby rotating nozzle vane 52 generally clockwise about the axis of spindle 56 to the engine idle condition illustrated generally in FIGURE 18.

The direction of the motive gases, as depicted by the heavy-shaded arrows in FIGURES 15–18, is controlled by the position of the nozzle vanes 52. For example, in FIGURE 18 the direction of the motive gases is such as to have the minimum reactive force against the turbine blades 30. The gas flows of FIGURES 15 and 16 are in the directions which cause the best possible reactive forces against the power turbine blades 30 in order to provide a propelling force to the vehicle, while the direction of gas flow in FIGURE 17 is generally opposite in that the effect of the gas impingement upon the turbine blades is to retard rotation of the turbine wheel 28 in order to effect a braking action upon the vehicle.

Figure 19:
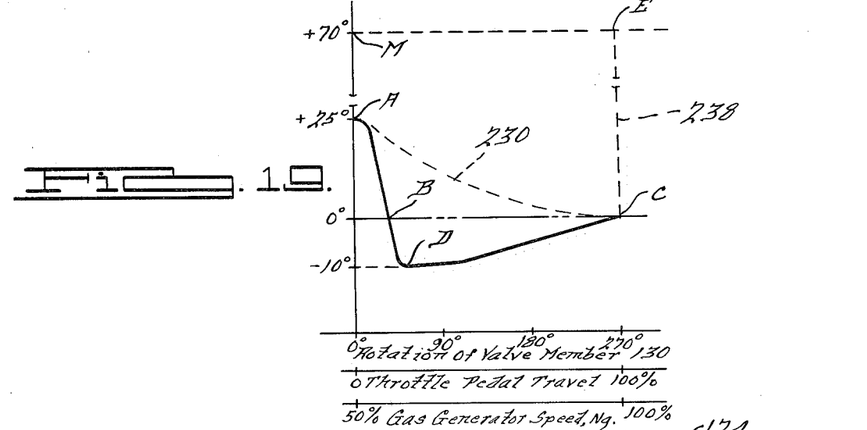
FIGURE 19 is a graph of nozzle vane angular position as compared to either throttle pedal travel, gas generator rotational speed or degrees of rotation of the rotary control valve assembly according to this invention.
Figure 20:
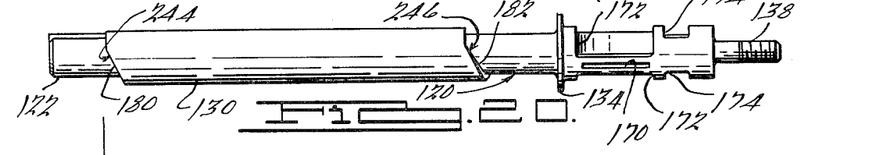
FIGURE 20 is an elevational view of a rotary control valve assembly constructed in accordance with this invention.

If the various nozzle vane positions are referred to in terms of degrees of rotation from the matched condition, which is that position of nozzle vanes resulting in optimum efficiency at 100% of rated engine speed, then a graph as illustrated in FIGURE 19 can be constructed. The various nozzle vane positions are designated along the vertical axis in terms of degrees of rotation; that is, +70° represents the vanes in the braking position of FIGURE 8, +25° represents the idle position of the vanes 52 shown in FIGURE 5, 0° indicates that the nozzle vanes 52 are in position for optimum efficiency at 100% of rated gas generator speed, while −10° represents an extreme position of the nozzle vanes in the economy range.

The rotational speed, $Ng$, of the compressor 20 and first rotor 14 (collectively referred to as the gas generator or gas producer), expressed as percentages of rated maximum speed, is plotted along the horizontal axis of the graph of FIGURE 19. Also, along the same axis are plotted the degrees of rotation of valve member 130 and the percentage of movement of the operator controlled throttle pedal 215.

In view of the preceding description and the reference to the graph of FIGURE 19, it should be apparent that for every angular position the throttle pedal 215 or valve member 130, a specific corresponding position of the nozzle vanes 52 exists.

For example, referring again to FIGURE 19, let it be assumed that the engine is at idle condition and that the nozzle vane position is represented by point A. Now, if the throttle pedal 215 and valve member 130 are rapidly rotated to their maximum positions, the nozzle vanes would tend to move in accordance with the dash-line 230 from point A to point C. (The maximum acceleration position of lever 160 is indicated by centerline 232 of FIGURE 3 while the maximum economy position, corresponding to FIGURES 7 and 16 is indicated by centerline 236.) However, if the valve member 130 and throttle pedal 215 are rotated, in comparison, relatively slowly to the same maximum position, then the nozzle vanes 52 would move from point A to point C in accordance with the line described by points A, B, D and C.

In view of the above it can be seen that the same ultimate position, point C, can be achieved by the nozzle vanes 52, starting from position A, even though the approach to point C is by different paths. The difference, as already implied, is due to the rapidity with which the valve member 130 is rotated and more specifically the hysteresis of the slave piston 86 and associated circuitry. The same, of course, holds true of acceleration from any point on the curve A, B, D, and C; that is, relatively rapid rotation of valve member 130 tends to cause movement of nozzle vanes 52 in a manner deviating from curve A, B, D, and C while relatively slow rotation of valve member 130 causes movement of vanes 52 substantially in accordance with said curve. Points A, D and C, of course, correspond to FIGURES 5 and 18, FIGURES 7 and 16 and FIGURES 6 and 15, respectively.

If the engine was operating at point C and it was desired to decelerate the vehicle, as for a sudden stop, lever 160 would be rotated from the position indicated by centerline 232 in FIGURE 3 to that indicated by centerline 234 thereby causing valve member 130 to rotate to 0° position. This, in turn, causes the nozzle vanes 52 to rotate from point C along line 238 until they assume the braking position of +70°, represented by point E which position would be maintained as gas generator speed decreased to its indicated minimum of 50%. Of course, once the vehicle speed decreased below the assumed minimum speed of 10 m.p.h., the nozzle vanes would rotate from point M to the idle condition of point A.

The curve depicted generally by points A, B, D and C illustrates the desired relationship to be achieved as between, for example, the throttle pedal travel and the angular position in the nozzle vanes 52. This relationship is, of course, empirical and would be determined for the particular structure then under consideration.

The invention as herein disclosed provides a novel method which enables the quick and accurate construction of, for example, control valve assemblies as 80. That is, referring to FIGURE 19, if the −10° line is considered as being a reference point, then it becomes apparent that for each increment of angular displacement, there is a linear or vertical displacement from that reference line to a corresponding single point on the operating curve A, B, D and C.

Figure 21:
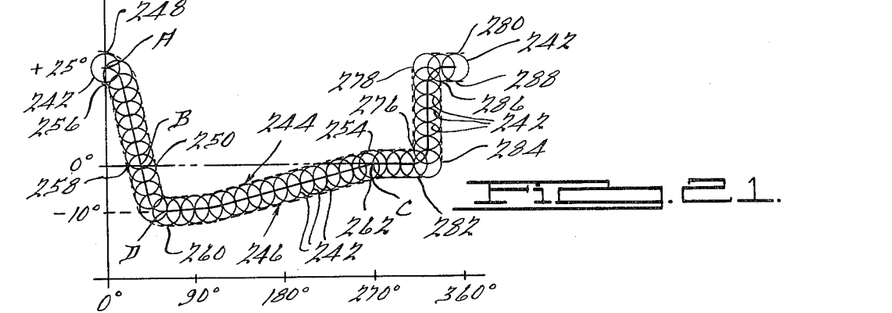
FIGURE 21 illustrates a curve, substantially as that shown in FIGURE 19, along with a graphic illustration of the manner in which such curve can be employed in the development of proper contoured surfaces for the rotary control valve assembly.

Referring to FIGURE 21 and any of FIGURES 5, 6, 7 or 8, let it be assumed that ports 92 and 88 of, for example, FIGURE 5 are of the same cross-sectional configuration and size and that circle 242 of FIGURE 21 is the shape and size of the ports 88 and 92. If a plurality of such circles 242 are drawn so as to be in overlapping relationship to each other and so as to have their respective centers coincident with the operating curve A, B, D and C, two separated boundary lines 244 and 246 can be constructed by drawing such lines so as to be tangent to the circles 242 as shown in FIGURE 21.

As previously indicated valve assembly 120 is intended to be functional for only 270° of rotation which would be angularly equivalent to the span from point A to point C. Accordingly, with regard to the boundaries 244 and 246, points 248 and 256 are angularly equivalent to point A, points 252 and 260 the equivalents of point D and points 254 and 262 the equivalents of point C.

Figure 4:
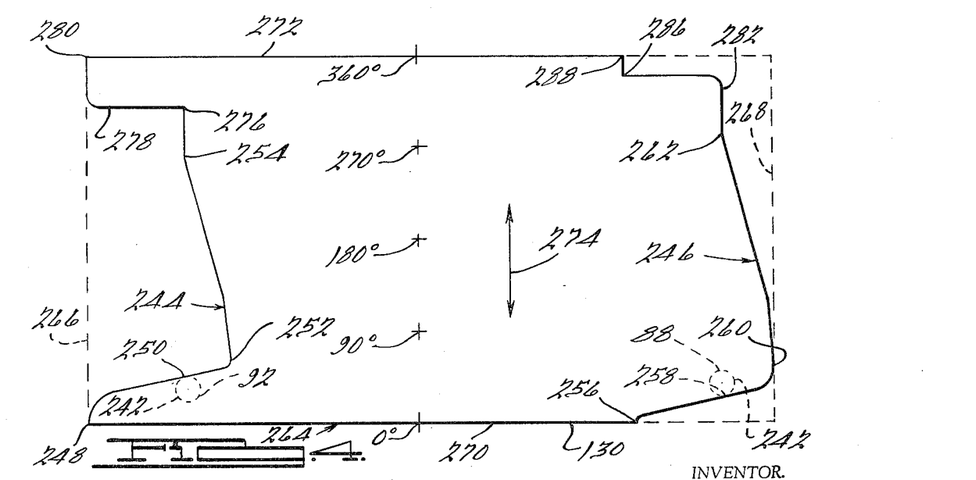
FIGURE 4 is a diagrammatic representation of one of the elements comprising the invention.

Referring now to FIGURE 4, let it be assumed that 264 represents a substantially flat and rectangular piece of formable material having ends 266 and 268 as indicated generally by the dash-lines. Next, end 266 is formed so as to have the configuration of boundary 246 therein. If the distance between edges 270 and 272 is equated to 360°, then it becomes apparent that all of the points of boundaries 244 and 246 maintain the same relationship as that shown by FIGURE 21.

If ports 92 and 88 are now located as shown and if it is assumed that the cam or valve member 130 is capable of movement only in the directions of arrows 274, then it becomes evident that as member 130 is moved either upwardly or downwardly, that the slave member in which ports 92 and 88 are formed will move so as to have both ports 88 and 92 substantially tangent to the curves or edges 246 and 244, respectively. The same related action can be obtained by forming member 130 into tubular form and mounting it on the mandrel or other rotary support such as 122.

Since the valve member 130 as disclosed is to function for only 270° of rotation the remaining 90° segment of the member 130 can be formed in any desirable contour as indicated by the continuation of boundary 244 through points 276, 278 and 280 and the continuation of boundary curve 246 through points 282, 284, 286 and 288, as shown on FIGURES 21 and 4.

If member 130 is made of metal, it is preferable that the outer diameter be ground as nearly circular in cross-section as practical in order to obtain the best sliding fit with the slave 86.

In view of the foregoing, it should be apparent that many benefits are derived by use of the disclosed invention. For example, even though tremendously large hydraulic forces can be applied against the slave piston 86 the valve member 130 does not have to sustain high axially directed forces. Further, valve member 130 does not move axially in order to cause movement of slave 86. Therefore, any frictional resistance (if it should ever occur) between valve 130 and slave 86 does not result in the axial movement of valve 130 and the attendant hunting and surging of slave 86.

It should also be apparent from the description that various valve assemblies 120 having differing contours 180 and 182 of valve member 130 can be used interchangedly. That is, for example, should one particular turbine engine be found to require a slightly different relationship than that shown by curve A, B, D and C, it would be a simple matter to construct a valve member 130 possessing the required contour and installing it into the cooperating mechanism.

In other instances it is necessary to shift an established curve A, B, D and C to either the right or the left with respect to the axis of abscissas of, for example, FIGURE 19. This can be easily achieved by merely rotating lever 160 some small amount relative to shaft 154. Further, the responsiveness of the overall system, including the throttle pedal 215, can be increased by merely changing gears 142 and 156. In this manner the relationship between the degrees of rotation of valve member 130 and the percentage of available throttle pedal travel can be changed so that for the same increment of travel of the throttle pedal an increased increment of travel of the valve member 130 is realized.

Although only one embodiment of the invention has been disclosed and described it is apparent that other embodiments and modifications of the invention are possible within the scope of the appended claims.

I claim:

1. A closed-loop error detecting servo system for creating an output displacement in accordance with a signal generated by external control means, comprising a housing, a slave piston slidably received by said housing and adapted to create said output displacement by virtue of at least two distinct fluid pressures acting thereagainst, porting means formed in and carried by said slave piston, a servo valve slidably received in said slave piston and adapted to be rotated to selected positions with respect to said housing and said slave piston by said external signal generating means, and a contoured valve member carried by said servo valve, said porting means cooperating with said contoured valve member to be effective upon rotation of said servo valve in a first direction with respect to said slave piston to increase one of said distinct fluid pressures thereby causing said slave piston to move axially in one direction thereby creating a correlative output displacement, said porting means also being effective upon rotation of said servo valve in a direction opposite to said first direction to decrease said one of said distinct fluid pressures thereby causing said slave piston to move axially in a direction opposite to said one direction thereby also creating a correlative output displacement.

2. A closed-loop error detecting servo system for creating an output displacement in accordance with a signal generated by first external control means, comprising a housing, a slave piston slidably received by said housing and adapted to create said output displacement by virtue of at least two distinct fluid pressures acting thereagainst, porting means formed in and carried by said slave piston, a servo valve slidably received in said slave piston and adapted to be rotated to selected positions with respect to said housing and said slave piston by said first external signal generating means, a contoured valve member carried by said servo valve, said porting means cooperating with said contoured valve member so as to be effective upon rotation of said servo valve in a first direction with respect to said slave piston to increase one of said distinct fluid pressures thereby creating a correlative output displacement, said porting means also being effective upon rotation of said servo valve in a direction opposite to said first direction to decrease said one of said distinct fluid pressures thereby causing said slave piston to move axially in a direction opposite to said one direction thereby also creating a correlative output displacement, and additional means responsive collectively to said first external signal generating means and a second external signal generating means for increasing said one of said distinct fluid pressures causing said slave piston to move axially in said one direction to a maximum extent and simultaneously rendering said porting means ineffective for decreasing said one of said distinct fluid pressures.

3. A closed-loop error detecting servo system having a pressure responsive slave piston for creating an output displacement corresponding to an input request signal generated by first external control means, comprising a housing slidably receiving said piston in a manner creating first and second distinct but variable chambers, a first pressurized fluid directed to said first chamber, a second pressurized fluid directed to said second chamber, said first and second pressurized fluids being effective to maintain said slave piston in selected positions, a servo valve slidably received in said slave piston and rotatably positioned with respect to said housing by said first external signal generating means, first and second axially spaced porting means formed in said slave piston, a contoured valve member carried by said servo valve, said second porting means and valve member cooperating with each other to provide controlled communication between said first and second chambers, said second porting means, enabling communication between said first and second chambers in order to relatively increase the pressure of said second pressurized fluid in said second chamber whenever the slave piston tends to move axially in the direction of said second chamber, said first porting means permitting communication between said second chamber and an area of low pressure in order to relatively decrease the pressure of said second pressurized fluid in said second chamber whenever said slave piston tends to move in the direction of said first chamber, and means responsive collectively to said first external signal generating means and a second external signal generating means for increasing the pressure of said second pressurized fluid causing said slave piston to move axially a maximum amount in the direction of said first chamber and simultaneously rendering said first porting means ineffective for decreasing the pressure of said second pressurized fluid.

4. A closed-loop servo system comprising a housing, a general chamber formed in said housing, a pressure responsive slave piston slidably received by said general chamber forming first and second variable but distinct pressure chambers, a variably positionable rotatable servo valve assembly for varying the pressure within at least one of said variable but distinct pressure chambers in order to cause correlative displacement of said slave piston, porting means formed in and carried by said slave piston for creating a null position of the slave piston with respect to said servo valve once said slave piston has been displaced a sufficient amount, conduit means communicating between said porting means and an area of relatively low pressure, control means associated with said servo valve for selectively rotating said servo valve, and additional means responsive to a selected operating parameter and effective upon said control means attaining a predetermined position for causing said area of relatively low pressure to become an area of relatively high pressure so as to displace said slave piston a maximum distance in one direction and cause said servo system to cease functioning as a closed-loop.

5. An arrangement for controlling the position of adjustable nozzles within a gas turbine engine employed for propelling a vehicle by means of an output shaft driven by the power turbine of said engine, comprising a housing having a cylindrical chamber formed therein; a slave piston slidably received through a first wall portion of said chamber operatively connected to said nozzles and having a head portion of enlarged diameter slidably received within said chamber, said head portion serving to divide said cylindrical chamber into first and second variable but distinct pressure chambers, a cylindrical bore formed in said slave piston axially thereof; a generally cylindrical servo valve, said servo valve comprising a bearing portion journalled in a second wall portion of said chamber opposite to said first wall portion, a support portion carried by said bearing portion and having an end projecting into said cylindrical bore, a radially directed flange for axially abutting against said second wall portion, the other end of said servo valve being formed to provide means for mounting a first gear thereto, a first conduit formed in said servo valve axially thereof and extending from said one end to said other end, a servo valve member formed about said support portion and secured thereto, a first contoured edge formed on said valve member, a second contoured edge formed on said valve member and axially spaced from said first contoured edge portion; a second conduit formed through said slave piston adapted to at times complete communication between said second distinct pressure chamber and said cylindrical bore and said first conduit; a third conduit formed in said slave piston and axially spaced from said second conduit adapted to at times complete communication between said first variable pressure chamber and said second variable pressure chamber; a first generally radial passage formed through said bearing portion; a second generally radial passage formed through said bearing portion; said first and second radial passages being both angularly and axially spaced from each other; a cylindrical valve chamber; fourth conduit means continually communicating between a source of pressurized fluid and said cylindrical valve chamber; fifth conduit means continually communicating between seaid cylindrical valve chamber and said first variable pressure chamber; sixth conduit means having one end in continual communication with said cylindrical valve chamber and having its other end adapted for at times communication with said first radial passage; seventh conduit means having one end in continual communication with said cylindrical valve chamber and having its other end adapted for at times communication with said second radial passage; a selector valve member slidably received within said cylindrical valve chamber and resiliently biased towards a first of two operating positions; eighth conduit means continually communicating between said cylindrical valve chamber and an area of relatively low pressure; said selector valve when in said first operating position being effective for preventing communication between said sixth conduit means and said fourth conduit means and said selector valve also being effective when in either of two operating positions to prevent the direct communication of said fourth and eighth conduit means through said cylindrical valve chamber; means for locking said first gear to said servo valve; a shaft journalled in said housing and having one end projecting without said housing; linkage means operatively connected to said projecting end for enabling manual positioning thereof; a second gear fixed to said shaft internally of said housing and in meshed engagement with said first gear; and guide means for preventing rotation of said slave piston and limiting said slave piston to substantially only axial movement; said linkage means being effective upon movement to rotate said second and first gears in order to rotate said servo valve from and to positions corresponding to idle engine operation, engine braking, maximum engine economy and maximum engine acceleration; said servo valve being effective whenever rotated to a position whereat said first contoured edge of said servo valve member causes said second conduit to become more nearly open and said second contoured edges causes said third conduit to become more nearly closed to cause said slave piston to move in a direction resulting in an enlargement of said second variable chamber and a reduction in size of said first variable chamber; said first radial passage communicating with said sixth conduit means during only the range of engine idle operation and engine braking; and said second radial passage communicating with said seventh conduit means during all ranges of engine operation except engine idle operation and engine braking.

6. An arrangement for controlling the position of adjustable nozzles within a gas turbine engine employed for propelling a vehicle by means of an output shaft driven by the power turbine of said engine, comprising a housing having a cylindrical chamber formed therein; a slave piston slidably received through a first wall portion of said chamber operatively connected to said nozzles and having a head portion of enlarged diameter slidably received within said chamber, said head portion serving to divide said cylindrical chamber into first and second variable but distinct pressure chambers, a cylindrical bore formed in said slave piston axially thereof; a generally cylindrical servo valve, said servo valve comprising a bearing portion journalled in a second wall portion of said chamber opposite to said first wall portion, a support portion carried by said bearing portion and having an end projecting into said cylindrical bore, the other end of said servo valve being formed to provide means for mounting a first gear thereto, a first conduit formed in said servo valve axially thereof and extending from said one end to said other end, a servo valve member formed about said support portion and secured thereto, a first contoured edge formed on said valve member, a second contoured edge formed on said valve member and axially spaced from said first contoured edge portion; a second conduit formed through said slave piston adapted to at times complete communication between said second distinct pressure chamber and said cylindrical bore and said first conduit; a third conduit formed in said slave piston axially spaced from said second conduit and adapted to at times complete communication between said first variable pressure chamber and said second variable pressure chamber; a first generally radial passage formed through said bearing portion; a second generally radial passage formed through said bearing portion; said first and second radial passages being both angularly and axially spaced from each other; a cylindrical valve chamber; fourth conduit means continually communicating between a source of pressurized fluid and said cylindrical valve chamber; fifth conduit means continually communicating between said cylindrical valve chamber and said first variable pressure chamber; sixth conduit means having one end in continual communication with said cylindrical valve chamber and having its other end adapted for at times communication with said first radial passage; seventh conduit means having one end in continual communication with said cylindrical valve chamber and having its other end adapted for at times communication with said second radial passage; a selector valve member slidably received within said cylindrical valve chamber and resiliently biased towards a first of two operating positions; eighth conduit means, continually communicating between said cylindrical chamber and an area of relatively low pressure; said selector valve when in said first operating position being effective for preventing communication between said sixth conduit means and said fourth conduit means and said selector valve also being effective when in either of two operating positions to prevent the direct communication of said fourth and eighth conduit means through said cylindrical valve chamber; means for locking said first gear to said servo valve; a shaft journalled in said housing and having one end projecting without said housing; linkage means operatively connected to said projecting end for enabling manual positioning thereof; a second gear fixed to said shaft internally of said housing and operatively engaged with said first gear; and guide means for preventing rotation of said slave piston and limiting said slave piston to substantially only axial movement; said linkage means being effective upon movement to rotate said second and first gears in order to rotate said servo valve from and to positions corresponding to idle engine operation, engine braking, maximum engine economy and maximum engine acceleration; said servo valve being effective whenever rotated to a position whereat said first contoured edge of said servo valve member causes said second conduit to become more nearly open and said second contoured edge causes said third conduit to become more nearly closed to cause said slave piston to move in a direction resulting in an enlargement of said second variable chamber and a reduction in size of said first variable chamber; said first radial passage communicating with said sixth conduit means during only the range of engine idle operation and engine braking; and said second radial passage communicating with said seventh conduit means during all ranges of engine operation except engine idle operation and engine braking.

7. An arrangement for controlling the position of adjustable nozzles within a gas turbine engine employed for propelling a vehicle by means of an output shaft driven by the power turbine of said engine, comprising a housing having a cylindrical chamber formed therein; a slave piston slidably received through a first wall portion of said chamber operatively connected to said nozzles and having a head portion of enlarged diameter slidably received within said chamber, said head portion serving to divide said cylindrical chamber into first and second variable but distinct pressure chambers, a cylindrical bore formed in said slave piston axially thereof; a generally cylindrical servo valve, said servo valve comprising a bearing portion journalled in a second wall portion of said chamber opposite to said first wall portion, a support portion carried by said bearing portion and having an end projecting into said cylindrical bore, the other end of said servo valve being formed to provide means for mounting a first gear thereto, a first conduit formed in said servo valve axially thereof and extending from said one end to said other end, a servo valve member formed about said support portion and secured thereto, a first contoured edge formed on said valve member, a second contoured edge formed on said valve member and axially spaced from said first contoured edge portion; a second conduit formed through said slave piston adapted to at times complete communication between said second distinct pressure chamber and said cylindrical bore and said first conduit; a third conduit formed in said slave piston and axially spaced from said second conduit adapted to at times complete communication between said first variable pressure chamber and said second variable pressure chamber; a first generally radial passage formed through said bearing portion; a second generally radial passage formed through said bearing portion; said first and second radial passages being both angularly and axially spaced from each other; a cylindrical valve chamber; fourth conduit means continually communicating between a source of pressurized fluid and said cylindrical valve chamber; fifth conduit means continually communicating between said cylindrical valve chamber and said first variable pressure chamber; sixth conduit means having one end in continual communication with said cylindrical valve chamber and having its other end adapted for at times communication with said first radial passage; seventh conduit means having one end in continual communication with said cylindrical valve chamber and having its other end adapted for at times communication with said second radial passage; a selector valve member slidably received within said cylindrical valve chamber and resiliently biased towards a first of two operating positions; eighth conduit means continually communicating between said cylindrical valve chamber and an area of relatively low pressure; said selector valve when in said first operating position being effective for preventing communication between said sixth conduit means and said fourth conduit means and said selector valve also being effective when in either of two operating positions to prevent the direct communication of said fourth and eighth conduit means through said cylindrical valve chamber; means for locking said first gear to said servo valve; a shaft journalled in said housing and having one end projecting without said housing; linkage means operatively connected to said projecting end for enabling manual positioning thereof; a second gear fixed to said shaft internally of said housing and operatively engaged with said first gear; guide means for preventing rotation of said slave piston and limiting said slave piston to substantially only axial movement; said linkage means being effective upon movement to rotate said second and first gears in order to rotate said servo valve from and to positions corresponding to idle engine operation, engine braking, maximum engine economy and maximum engine acceleration; said servo valve being effective whenever rotated to a position whereat said first contoured edge of said servo valve member causes said second conduit to become more nearly open and said second contoured edge causes said third conduit to become more nearly closed to cause said slave piston to move in a direction resulting in an enlargement of said second variable chamber and a reduction in size of said first variable chamber; said first radial passage communicating with said sixth conduit means during only the range of engine idle operation and engine braking; and said second radial passage communicating with said seventh conduit means during all ranges of engine operation except engine idle operation and engine braking; and means responsive to power turbine speed for positioning said selector valve in the second of said two operating positions whenever the speed of said power turbine exceeds a predetermined minimum speed.

8. A closed-loop error detecting servo system for creating an output displacement in accordance with a signal generated by external control means, comprising a housing, a slave piston slidably received by said housing and adapted to create said output displacement by virtue of at least two distinct fluid pressures acting thereagainst, porting means formed in and carried by said slave piston, a servo valve slidably received in said slave piston and adapted to be rotated to selected positions with respect to said housing and said slave piston by said external signal generating means, a contoured valve member carried by said servo valve, said porting means cooperating with said contoured valve member to be effective upon rotation of said servo valve in a first direction with respect to said slave piston to increase one of said distinct fluid pressures thereby causing said slave piston to move axially in one direction thereby creating a correlative output displacement, said porting means also being effective upon rotation of said servo valve in a direction opposite to said first direction to decrease said one of said distinct fluid pressures thereby causing said slave piston to move axially in a direction opposite to said one direction thereby also creating a correlative output displacement, and means retained by said housing and slidably received by said slave piston for preventing rotation of said slave piston relative to said housing and said contoured valve member.

9. A closed-loop error detecting servo system for creating an output displacement in accordance with a signal generated by first external control means, comprising a housing, a slave piston slidably received by said housing and adapted to create said output displacement by virtue of at least two distinct fluid pressures acting thereagainst, porting means formed in and carried by said slave piston, a servo valve slidably received in said slave piston and adapted to be rotated to selected positions with respect to said housing and said slave piston by said first external signal generating means, a contoured valve member carried by said servo valve, said porting means cooperating with said contoured valve member so as to be effective upon rotation of said servo valve in a first direction with respect to said slave piston to increase one of said distinct fluid pressures thereby causing said slave piston to move axially in one direction thereby creating a correlative output displacement, said porting means also being effective upon rotation of said servo valve in a direction opposite to said first direction to decrease said one of said distinct fluid pressures thereby causing said slave piston to move axially in a direction opposite to said one direction thereby also creating a correlative output displacement, additional means responsive collectively to said first external signal generating means and a second external signal generating means for increasing said one of said distinct fluid pressures causing said slave piston to move axially in said one direction to a maximum extent and simultaneously rendering said porting means ineffective for decreasing said one of said distinct fluid pressures, and means retained by said housing and slidably received by said slave piston for preventing rotation of said slave piston relative to said housing and said contoured valve member, said last mentioned means comprising an elongated rod having its opposite ends secured to said housing and its portion intermediate said ends slidably received by said slave piston so as to be generally traversed thereby during operation of said slave piston.

10. A servo system for creating an output displacement in accordance with a signal generated by external manual control means, comprising a housing, a slave piston slidably received by said housing and adapted to create said output displacement during normal periods of operation by virtue of at least two distinct fluid pressures acting thereagainst, first and second porting means formed in and carried by said slave piston, a servo valve slidably received in said slave piston and adapted to be rotated to selected positions with respect to said housing and said slave piston by said first external signal generating means, a contoured valve member carried by said servo valve, said first and second porting means cooperating with said contoured valve member so as to be effective upon rotation of said servo valve and servo valve member in a first direction with respect to said slave piston to increase one of said distinct fluid pressures thereby causing said slave piston to move axially in one direction thereby creating a correlative output displacement, said first and second porting means also being effective upon rotation of said servo valve and servo valve member in a direction opposite to said first direction to decrease said one of said distinct fluid pressures thereby causing said slave piston to move axially in a direction opposite to said one direction thereby also creating a correlative output displacement, and additional porting means also controlled by said contoured valve member for at times causing said distinct fluid pressures to become substantially equal in order to cause said slave piston to exhibit a maximum output displacement.

References Cited by the Examiner
UNITED STATES PATENTS

| | | | |
|---|---|---|---|
| 2,376,519 | 5/45 | Stacy | 91—415 |
| 2,434,668 | 1/48 | May | 91—375 |
| 2,618,243 | 11/52 | Treganowan | 91—415 X |
| 3,020,890 | 2/62 | Grad | 91—375 X |
| 3,044,262 | 7/62 | Chadwick et al. | 60—39.16 |

JULIUS E. WEST, *Primary Examiner.*